US011772567B2

(12) United States Patent
Schroll

(10) Patent No.: US 11,772,567 B2
(45) Date of Patent: Oct. 3, 2023

(54) VEHICLE ROOF RACK ACCESSORY CLAMP

(71) Applicant: The Eastern Company, Naugatuck, CT (US)

(72) Inventor: Matthew Schroll, Glendale Heights, IL (US)

(73) Assignee: The Eastern Company, Naugatuck, CT (US)

( * ) Notice: Subject to any disclaimer, the term of this patent is extended or adjusted under 35 U.S.C. 154(b) by 525 days.

(21) Appl. No.: 16/902,896

(22) Filed: Jun. 16, 2020

(65) Prior Publication Data
US 2020/0391665 A1    Dec. 17, 2020

Related U.S. Application Data

(60) Provisional application No. 62/862,479, filed on Jun. 17, 2019.

(51) Int. Cl.
*B60R 9/058*    (2006.01)
*F16B 2/12*    (2006.01)

(52) U.S. Cl.
CPC ............... *B60R 9/058* (2013.01); *F16B 2/12* (2013.01)

(58) Field of Classification Search
CPC .................................. B60R 9/058; F16B 2/12
USPC ...................................................... 224/324
See application file for complete search history.

(56) References Cited

U.S. PATENT DOCUMENTS

| | | | | |
|---|---|---|---|---|
| 2,455,141 A | * | 11/1948 | Runge | F21V 21/00 248/74.1 |
| 3,240,455 A | * | 3/1966 | Swezy | G09F 17/00 224/558 |
| 3,469,810 A | * | 9/1969 | Dorris | F16B 2/12 248/245 |
| 3,601,295 A | * | 8/1971 | Lowe | B60R 9/06 224/558 |
| 4,848,112 A | * | 7/1989 | Graber | F16B 41/005 224/315 |
| 5,181,639 A | | 1/1993 | Kvänna | |
| 5,275,320 A | * | 1/1994 | Duemmler | B60R 9/045 224/330 |
| 5,657,913 A | * | 8/1997 | Cucheran | B60R 9/12 224/558 |
| 5,769,292 A | * | 6/1998 | Cucheran | B60R 9/045 224/321 |

(Continued)

FOREIGN PATENT DOCUMENTS

EP        3659865 A1 *  6/2020
WO   WO-2011102780 A1 *  8/2011  ............. B60R 9/055

*Primary Examiner* — Nathan J Newhouse
*Assistant Examiner* — Lester L Vanterpool
(74) *Attorney, Agent, or Firm* — Leydig, Voit & Mayer, Ltd.

(57) ABSTRACT

An improved modular vehicle accessory clamp for is disclosed. The clamp provides for gross and fine adjustment between the jaws to allow for differences in the width of vehicle roof rack cross bars. The clamp has a first body with a depending jaw and an extension portion and a second body portion also with a depending jaw and a receiving portion that receives the extension of the first body and allows for adjustment of the distance between the jaws. The clamp can be locked to the cross bar. Upper grooves in the clamp allow for easy attachment to vehicle accessories such as rooftop carriers.

13 Claims, 7 Drawing Sheets

(56) References Cited

U.S. PATENT DOCUMENTS

| | | | |
|---|---|---|---|
| 5,806,735 A * | 9/1998 | Christiansson | B60R 9/045 224/322 |
| 5,845,828 A * | 12/1998 | Settelmayer | B60R 9/045 224/331 |
| 5,996,736 A * | 12/1999 | Stankiewicz | B60R 9/0485 182/127 |
| 6,112,965 A * | 9/2000 | Lundgren | B60R 9/045 224/322 |
| 6,273,311 B1 * | 8/2001 | Pedrini | B60R 9/045 224/331 |
| 6,422,441 B1 | 7/2002 | Settelmeyer et al. | |
| 6,510,718 B1 * | 1/2003 | Chang | B60R 25/0225 70/237 |
| 6,622,898 B1 * | 9/2003 | Wang | B60R 9/045 224/325 |
| 6,896,232 B2 * | 5/2005 | Crowell | B25B 5/06 248/316.4 |
| 7,367,481 B2 * | 5/2008 | Barbara | B60R 9/058 224/330 |
| 8,381,866 B2 | 2/2013 | Höbel et al. | |
| 8,393,508 B2 * | 3/2013 | Sautter | B60R 9/045 224/570 |
| 8,444,033 B2 * | 5/2013 | Brochier | B60R 9/045 224/315 |
| 8,496,145 B2 * | 7/2013 | Sautter | B60R 9/10 224/924 |
| 8,499,888 B2 * | 8/2013 | Fontaine | E04G 5/003 211/113 |
| 8,556,146 B2 | 10/2013 | Sautter et al. | |
| 9,381,866 B2 | 7/2016 | Sautter et al. | |
| 10,150,423 B2 | 12/2018 | Sautter et al. | |
| 10,543,771 B2 * | 1/2020 | Sautter | B60P 3/34 |
| 10,583,784 B2 * | 3/2020 | Sautter | B60R 9/048 |
| 11,097,664 B2 * | 8/2021 | Vidar | B60R 9/048 |
| 2004/0211801 A1 * | 10/2004 | Barbara | B60R 9/045 224/319 |
| 2011/0139841 A1 * | 6/2011 | Sautter | B60R 9/045 224/324 |

\* cited by examiner

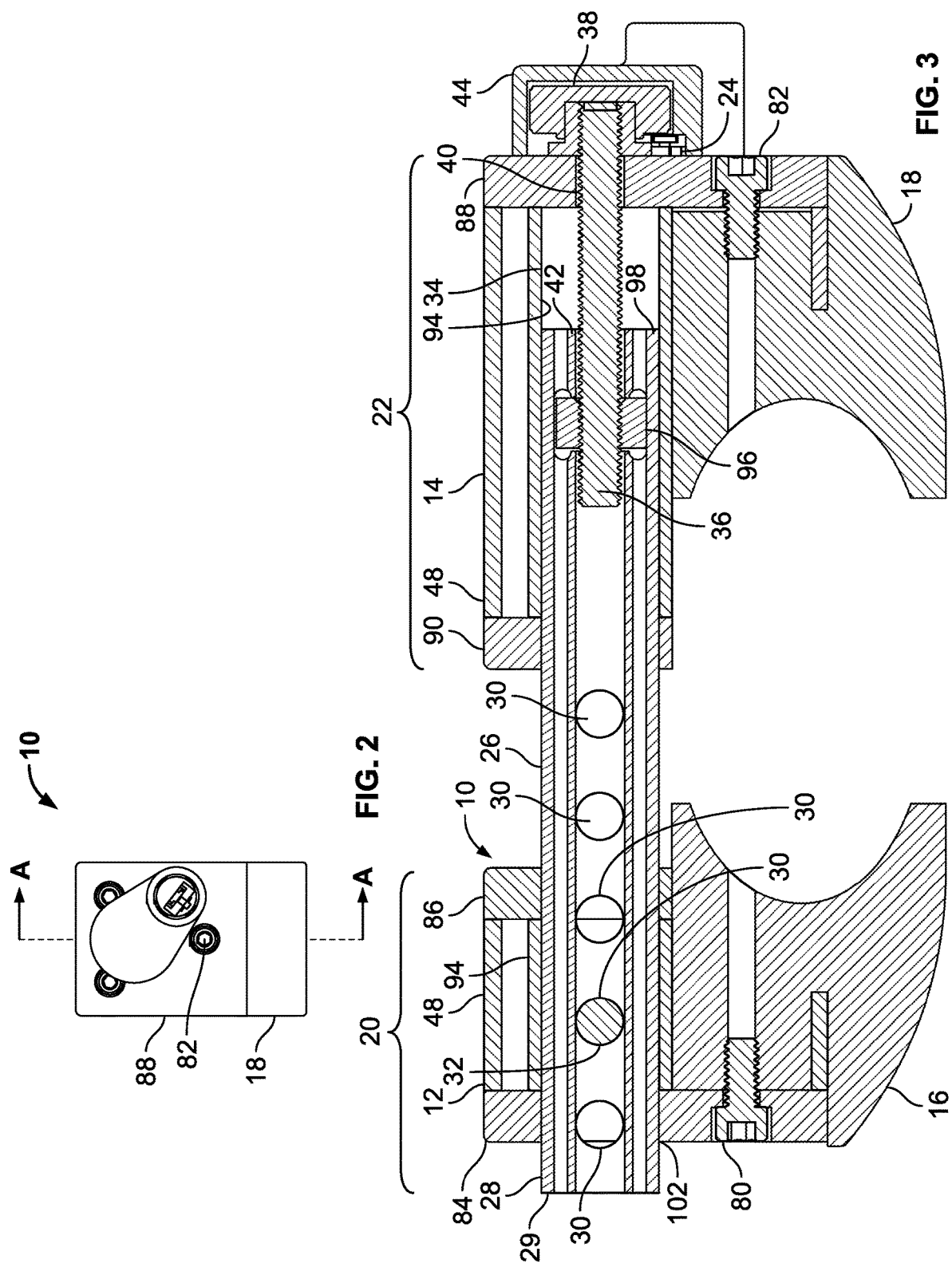

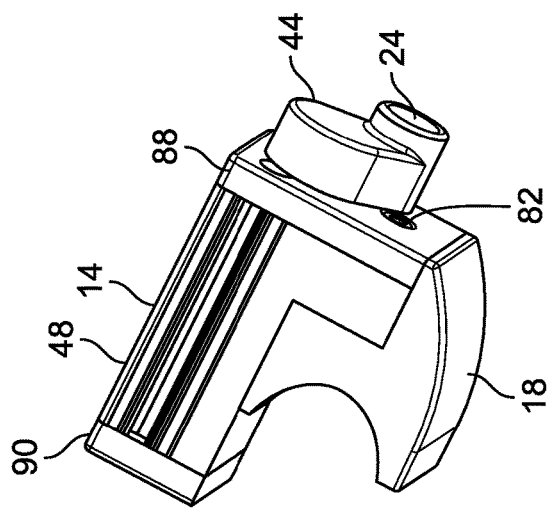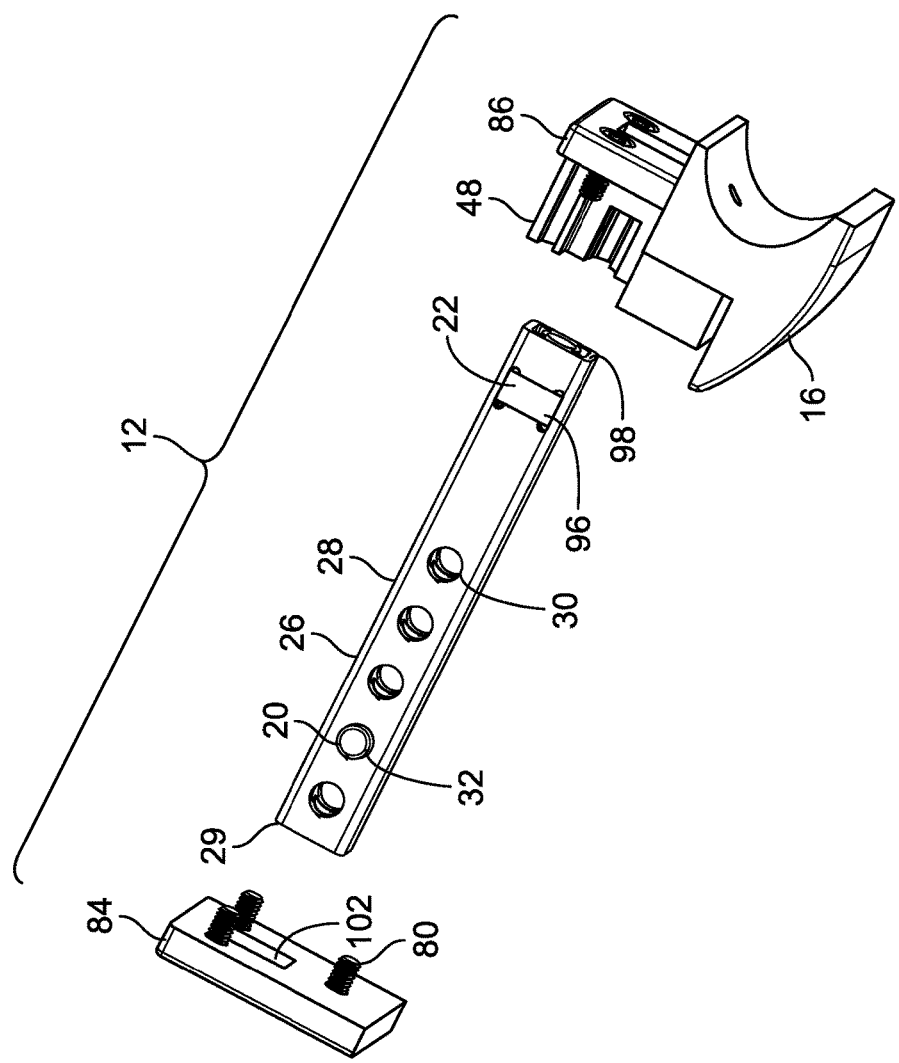
FIG. 6

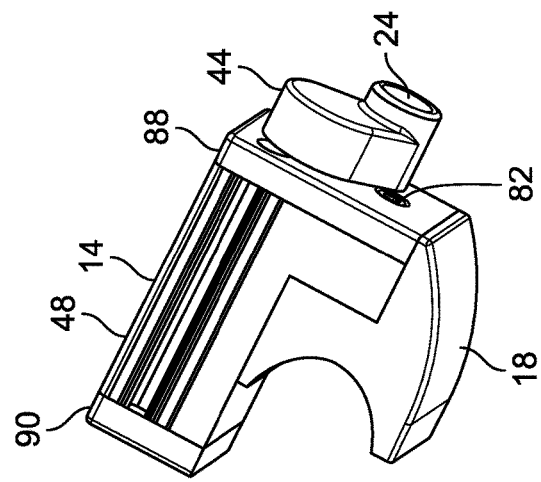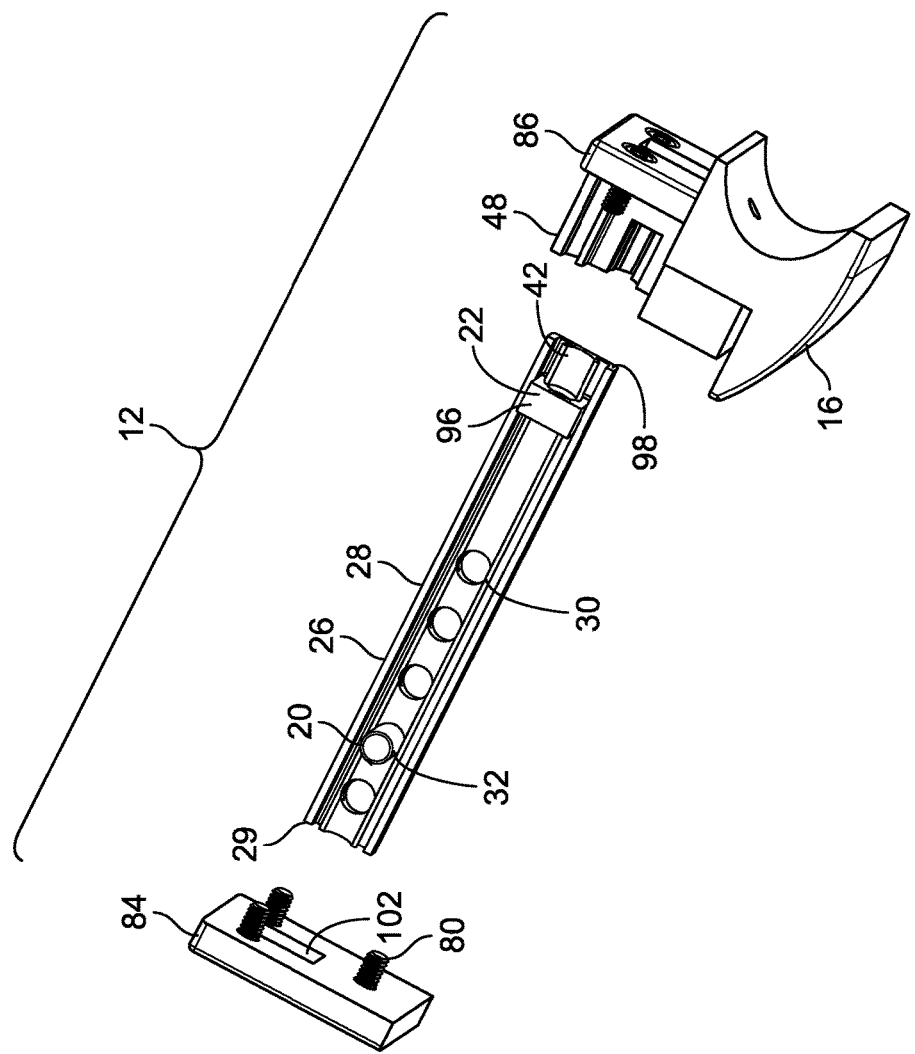
FIG. 7

VEHICLE ROOF RACK ACCESSORY CLAMP

CROSS-REFERENCE TO RELATED APPLICATIONS

This application claims the benefit of, and priority to, U.S. Provisional Patent Application No. 62/862,479, filed Jun. 17, 2019, which is incorporated by reference herein in its entirety.

TECHNICAL FIELD

The invention relates to a clamp for attaching accessories to the roof rack of a vehicle.

BACKGROUND OF THE INVENTION

Vehicle accessories are popular and provide extra utility to any vehicle, especially cars and light trucks. Many rooftop accessories and carriers are attached to roof racks and are used to carry sporting equipment and camping equipment, such as skis, snowboards and bicycles, and increasingly, even larger items such as kayaks and small tents. Often, while the sporting and camping equipment is being used, the vehicle, with its accessory is left unattended. There is a need for an improved clamp for attaching and securely retaining a vehicle accessory to the vehicle, especially the roof rack of the vehicle.

SUMMARY OF THE INVENTION

For a vehicle with a roof rack having cross bar having a width and first and second sides, the invention provides a clamp for attaching accessories to the cross bar, the clamp comprising a first body having a first jaw portion for contacting a first side of the cross bar and an extending portion, a second body having a second jaw portion for contacting a second side of the cross bar and a receiving portion adapted to receive the first body extending portion. One of the first and second bodies has a gross length adjustment to adapt the initial distance between the first and second jaw portions to slightly larger than the width of the cross bar, and the other of the first and second bodies has a fine adjustment adapted to cooperate with the other body for reducing the initial distance and securely capturing the cross bar between the first and second clamping portions. The clamp also has a lock having a locked condition and an unlocked condition, wherein when the lock is in the locked condition, length adjustments are inoperable.

The invention also provides a system for attaching accessories to the top of a vehicle having a cross bar comprising a clamp having a first body and a second body with each body comprising an aluminum extrusion having an interior bore and depending jaws adapted to contact opposite sides of the cross bar, with the bodies connected by a beam having a series of transverse holes adjacent to and extending from one end and a longitudinal bore extending inwardly from a second end and with a threaded nut captured in the bore, wherein a transverse pin extends through a selected hole in the beam and is captured in a transverse slot in the first body to create an initial distance between the depending jaws, and wherein a bolt with an exteriorly located head extends longitudinally though the bore in the second body and through the beam longitudinal bore and in threaded connection with the nut so that rotating the head of the bolt further adjusts the distance between the jaws.

In one embodiment, the clamp bodies are constructed of modular components, including an aluminum extrusion with T-shaped slots on the top and end plates. In another embodiment, the clamp also includes a removable torque handle. Interchangeable jaw portions are provided in another embodiment. In one embodiment, the extending portion comprises a beam with a plurality of transverse apertures that cooperate with a transverse pin to provide the gross adjustment. The fine adjustment is provided by a threaded bolt cooperating with a nut embedded into the extending portion.

BRIEF DESCRIPTION OF THE DRAWINGS

FIG. 2 is an end view of a clamp with a lock cover.

FIG. 3 is a cross section view taken along line A-A of FIG. 2.

FIG. 6 is an exploded partial cross section perspective view showing the exterior of the beam.

FIG. 7 is an exploded partial cross section perspective view showing the interior of the beam.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice versa without limiting the scope of the disclosure to the exact number or type of such elements unless set forth explicitly in the appended claims. The terms adapted, configured and configuration may be used herein to refer to a specified arrangement, or a structural size and shape.

Figure 1:
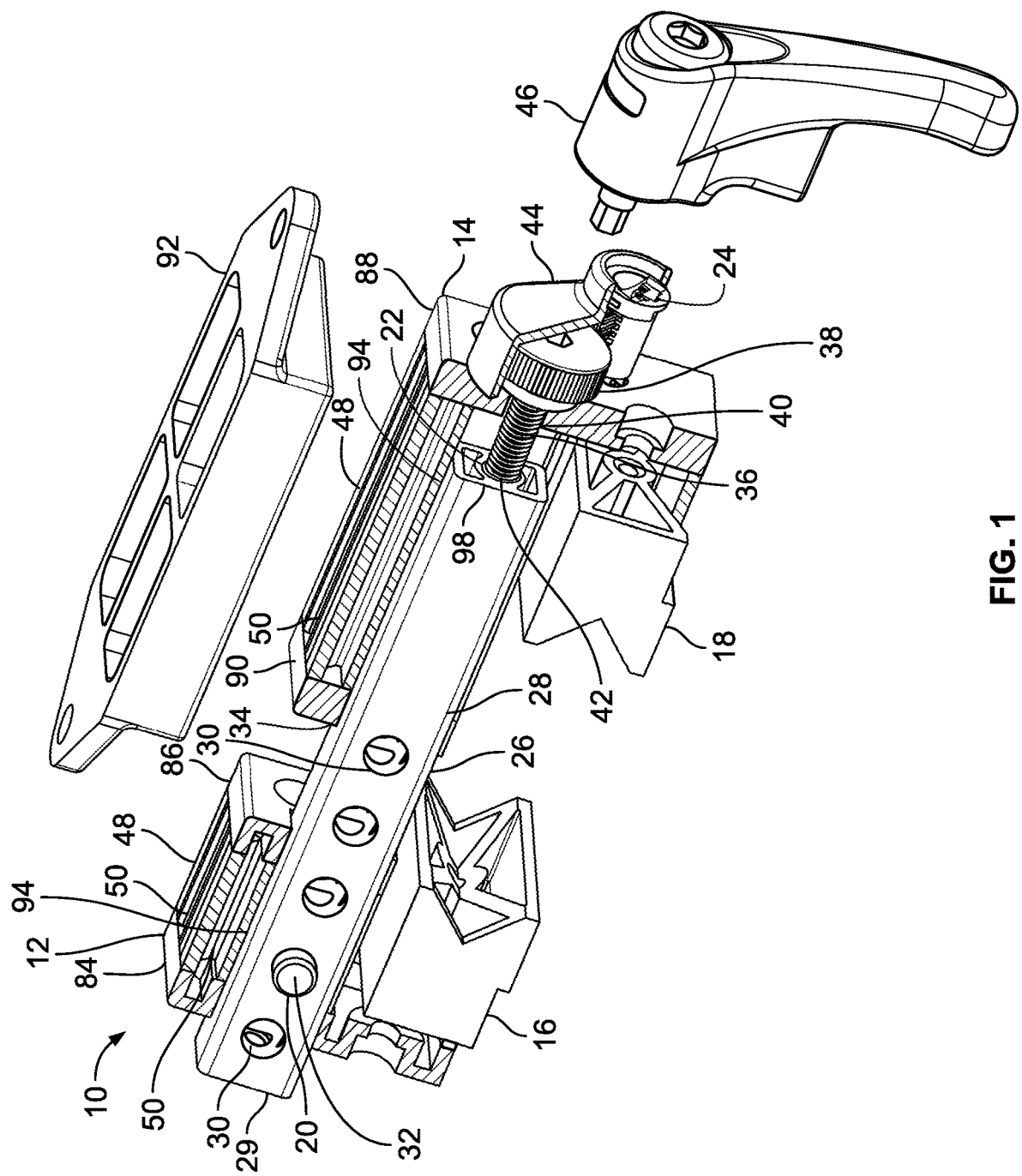
FIG. 1 is a partial cross section perspective view of a clamp with a lock cover, a tightening tool and a portion of an accessory.
Figure 4:
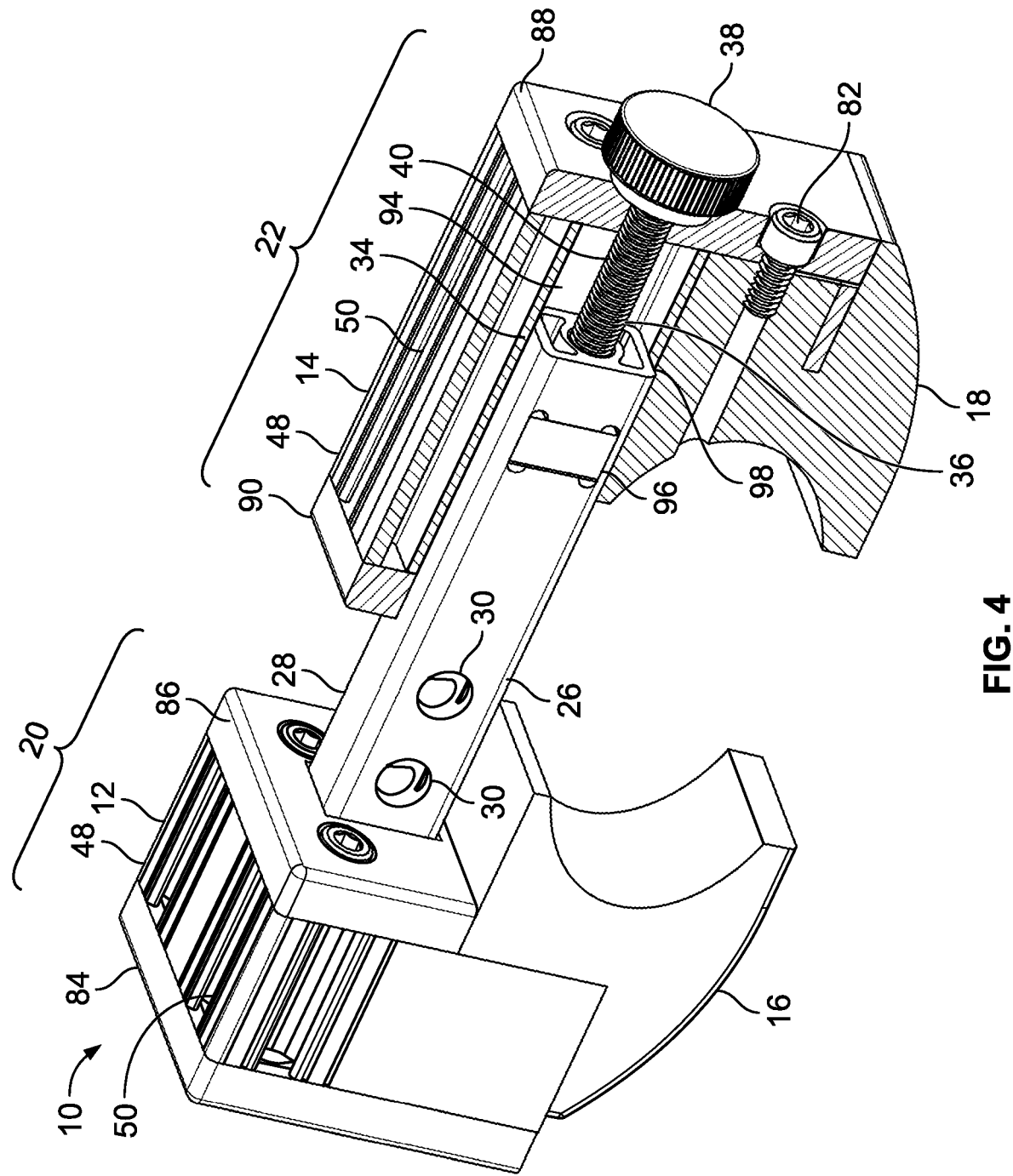
FIG. 4 is a partial cross section perspective view.
Figure 5:
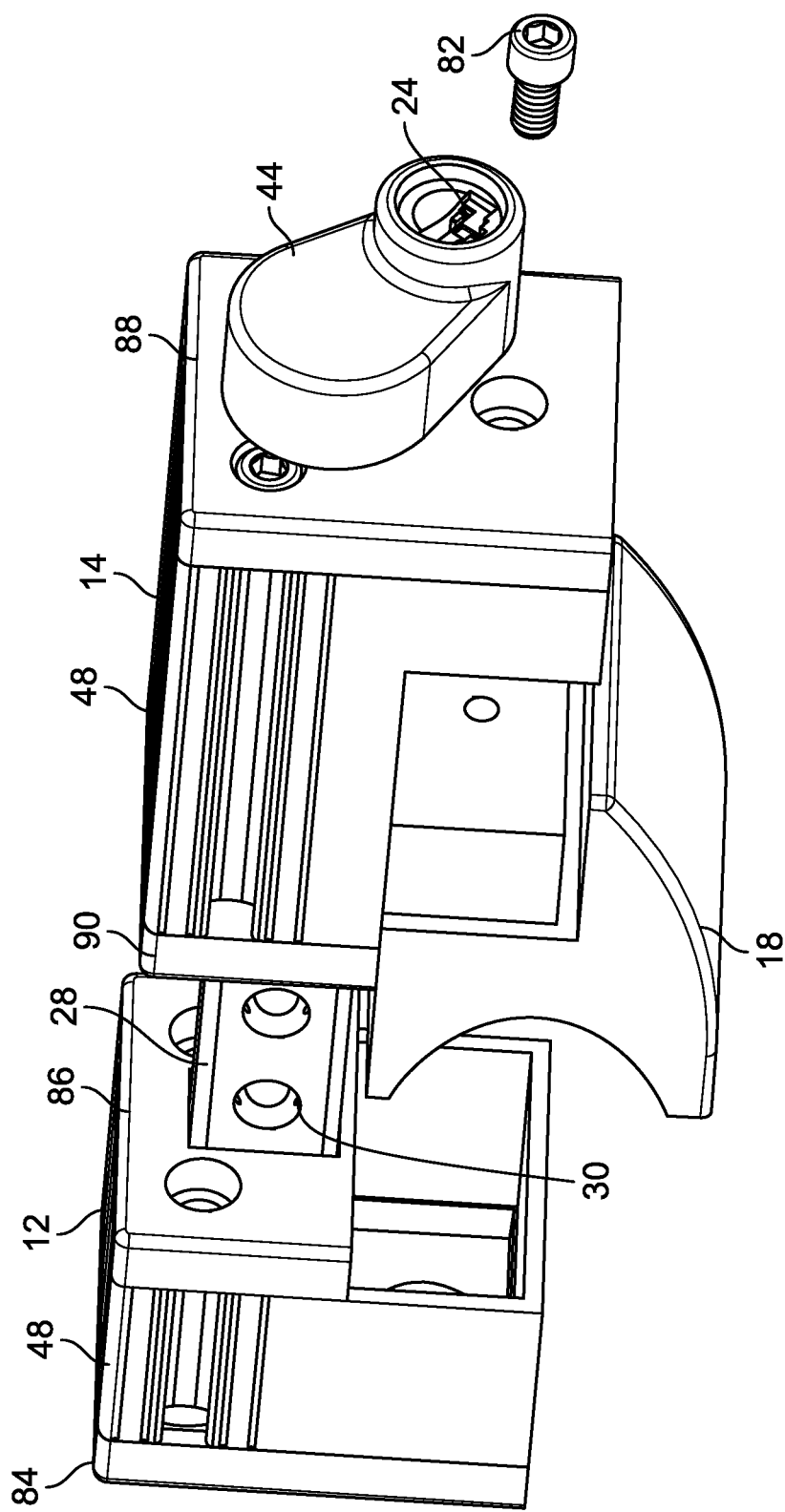
FIG. 5 is a partially exploded perspective view with one jaw portion missing and the other jaw portion being assembled.
Figure 8:
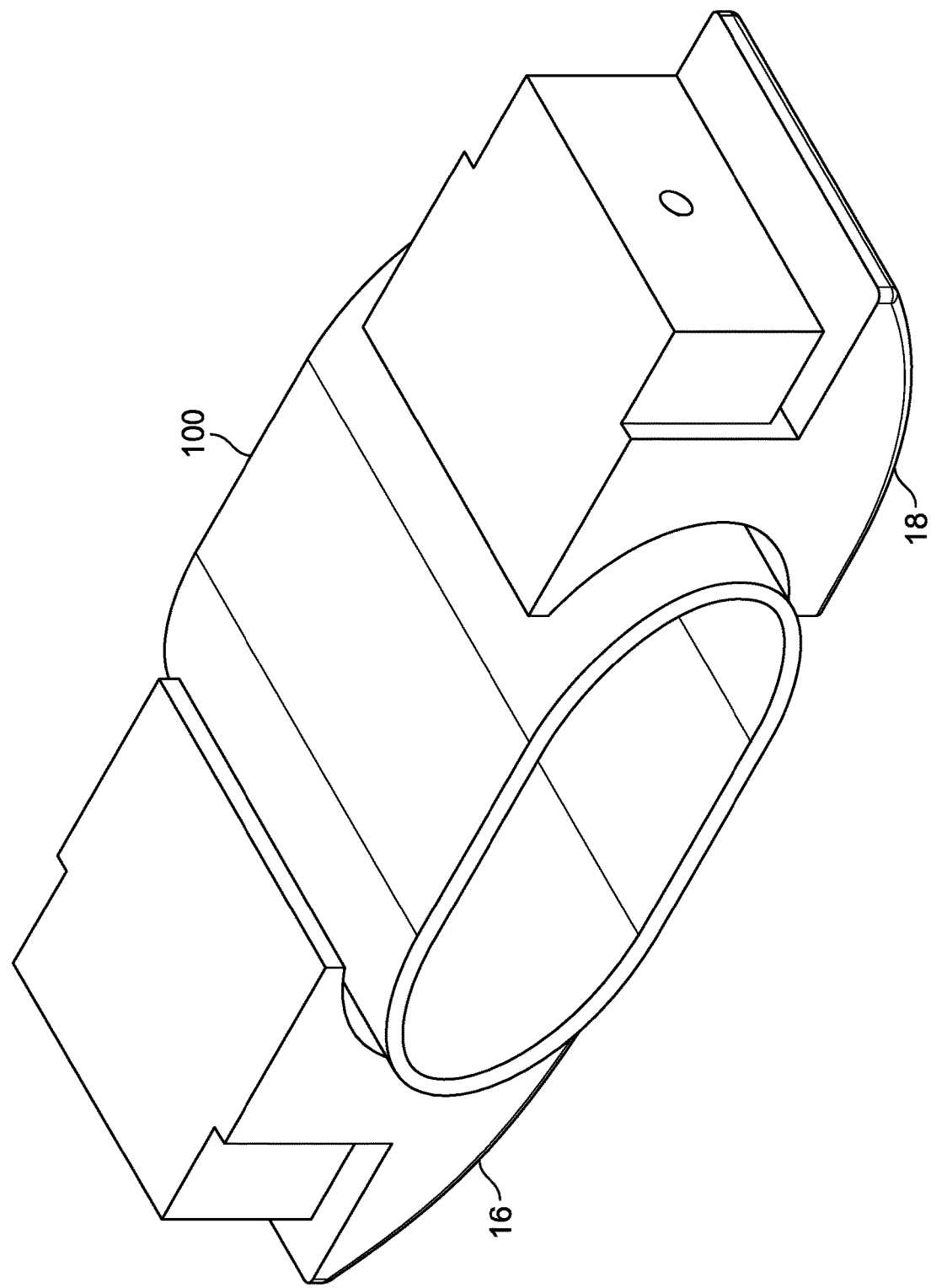
FIG. 8 is a perspective view of jaw portions contacting a vehicle cross bar.

The drawings show a clamp 10 having a first body 12 and a second body 14. The first body 12 has a generally depending clamping or jaw portion 16 and the second body has a generally depending clamping or jaw portion 18. The clamping portions are jaw shaped so that they at least partially surround and contact first and second sides of a cross bar 100 of a roof rack or luggage rack of a vehicle as depicted in FIG. 8. In practice, roof rack cross beams for vehicles such as automobiles, pick-up trucks and RV's vary widely in width and depth. It is preferable to have a clamp 10 constructed modularly to that the jaw portions 16 and 18 can be interchanged to match or at least complement the cross section of various vehicle cross bars. The jaw portions 16 and 18 of FIG. 1 have differently contoured faces than the jaw portions 16 and 18 of the other Figs. to accommodate different sized and shaped vehicle cross bars 100. As shown in FIGS. 1, 3 and 5, the jaw portions can be easily changed by unscrewing fasteners 80 and 82 and sliding the jaw portions into position.

Further modularity is achieved by the bodies 12 and 14 being constructed of preferably aluminum extrusions 48 (although other materials such as plastics may be employed) of similar cross section. The extrusions have T-shaped channels 50 on the topsides to facilitate attaching a base 92 of a vehicle accessory, such as a rooftop enclosed snow board carrier, ski rack or bike rack, to the clamp 10. Since the T-shaped channels 50 have a length and are included in both bodies 12 and 14 the exact location of complementary reverse (upside down) T-shaped fasteners depending from the base 92 do not need to be known, enhancing the universality of the clamp 10. The extrusions 48 also have longitudinal circular cross sectioned bores to accept threaded fasteners for holding interior 86 and 90 and exterior 84 and 88 end plates onto the ends of the extrusions 48. The extrusions also have a major longitudinal bore 94 that is complementarily sized to the beam 28 to allow the beam to pass through the bore 94. As noted below, the bore 94 in the first body 12 also has a slot to accept the pin 32 for securing the beam to the first body. Further modularity includes the interior end plates 86 and 90 being identical and the exterior end plates having similar outer dimensions, but having different apertures as described below.

A clamp 10 that will be universally accepted on vehicle roof rack cross bars of various widths preferably has a gross adjustment 20 for initially setting the distance between the jaws and a fine adjustment 22 of the distance in order to securely clamp the cross bar 100 between the jaws.

In one embodiment, the gross adjustment 20 in the first body 12 comprises an extension portion 26 that extends from the first body 12 and cooperates with a receiving portion 34 in the second body 14. The extension portion 34 comprises a beam 28 having a first end 29 a plurality of holes 30 extending from the first end 29 along a portion of the length of the beam 28. As shown in FIGS. 1 and 3 a transverse pin 32 is placed through one of the holes 30 and captured in a horizontal transverse slot in the first body 12. As can be appreciated in looking at FIGS. 1 and 3, the slot is deeper than the width of the pin 32. This enables the threads on the bolt 36 to be sure to fully catch the threads on the nut 96 to provide a secure attachment. The initial distance between the first and second clamping portions can be adjusted by placing the pin 32 in the appropriate aperture 30 which dictates how far the beam 28 will extend from the first body 12.

In practice this initial distance should be slightly longer than the width of the cross bar 100 so that the clamp can be initially placed over the cross bar for clamping thereto. The pin 32 can be placed in another hole 30 by removing the first body 12 exterior end plate 84, pushing the beam and pin 32 out of the first body, placing the pin 32 in another hole 30, sliding the beam and pin back into the slot, and replacing the end plate 84. The beam 28 can extend through a complementary square shaped aperture 102 in end plate 84.

Once the distance between the clamping portions 16 and 18 approximate the width of the cross bar, and the clamp 10 is placed over the cross bar, the distance between the jaws can be further reduced, and the clamp can be secured to the cross bar with the fine adjustment 22. In one embodiment, the fine adjustment 22 comprises a threaded bolt 36 with a head 38 on the outside of the second body 14 end plate 88 and a shaft that extends through a hole 40 in the end plate 88 of the second body 14 and into a bore 42 in the beam 28 at the beam's second end 98. Fixed in the bore 42 near the second end 98 of the beam 28 is a threaded nut 96. By turning the bolt, the clamping portions or jaws 16 and 18 are moved in a fine adjustment to secure the clamp 10 to either side of the cross beam 100. Further adjustment of the distance between the jaw portions 16 and 18 can be prohibited by a locking cover 44 over the head of the head 38 of the bolt 36. The cover 44 is held in place by a lock 24 that has an extension that fits into a complementary shaped hole in the exterior end plate 88 to secure the cover 44 onto the end plate 88 when in the locked condition and allows removal of the cover 44 when in the unlocked condition. The clamp may also include a removable torque handle 46 to aid in rotating the bold 36 as depicted in FIG. 1.

Although the above described clamp and system have been described, modifications to the device and system are contemplated by this disclosure. Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

I claim:

1. For a vehicle with a roof rack having a cross bar having a width and first and second sides, a clamp for attaching accessories to the cross bar. the clamp comprising:
   a first body having a first depending jaw portion separate from and attached to the first body for contacting a first side of the cross bar and an extending portion comprising a separate longitudinally extending beam having a first end with a series of transverse holes adjacent the first end and a second end with a longitudinal bore having threads adjacent the second end,
   a second body having a second depending jaw portion separate from and attached to the second body for contacting a second side of the cross bar and a receiving portion having a bore adapted to receive the second end of the first body extending portion and a threaded fastener,
   the first body and extending portion connected by a gross length adjustment utilizing, one of the transverse holes adjacent the first end of the beam to fix the beam to the first body and set the initial distance between the first and second jaw portions to be larger than the width of the cross bar,
   the second body, extending portion and receiving portion bodies having a fine length adjustment separate from the gross length adjustment, adjacent the second end of the extending portion and adapted to reduce the initial distance and securely capture the cross bar between the first and second jaw portions by rotating the threaded fastener in the threaded portion of the beam bore to move the beam and the first body relative to the second body, and
   a lock having a locked condition and an unlocked condition, wherein when the lock is in the locked condition, fine length adjustment is inoperable,
   wherein the clamp bodies are constructed of aluminum extrusions of identical cross section and with longitudinal T-shaped slots on the top sides and longitudinal circular cross sectional bores adapted to accept threaded fasteners for securing an end plate to the outer end of each body, with the end plates also attached to the jaw portions.

2. The clamp of claim 1 wherein the first body has a transverse pin having a length that is longer than the cross-sectional width of the beam, located in a transverse slot in the extrusion proximate the exterior end plate, with the pin extending through one of the holes in the beam, and with the pin accessible by removing the exterior end plate.

3. The clamp of claim 2 wherein the gross adjustment is achieved by removing the first body exterior end plate, placing the pin in the appropriate transverse hole in the beam and replacing the end plate.

4. The clamp of claim 1 wherein the beam longitudinal bore has a transverse threaded nut fixed in a slot in the beam adjacent the second end of the beam so that threads of the nut are coaxial with the axis of the bore.

5. The clamp of claim 4 wherein the threaded fastener comprises a bolt with a head on the outside of the second body end plate and threads extending through the second body and into the bore in the second end of the beam.

6. The clamp of claim 5 wherein the clamp also includes a removable torque handle adapted to turn the bolt.

7. The clamp of claim 1 wherein the jaw portions are interchangeably attached to the bodies and end plates and adaptable to complement the shapes of vehicle cross bars.

8. A system for attaching accessories to the top of a vehicle having a cross bar comprising a clamp having a first body and a second body with each body comprising aluminum extrusions of identical cross section, each having an interior bore and separate and attached depending jaws adapted to contact opposite sides of the cross bar and separate and attached exterior end plates, with the bodies connected by a beam having a series of transverse holes adjacent to and extending from one end and a longitudinal bore extending inwardly from a second end and with a non-rotatable threaded nut captured in the bore adjacent the second end, wherein a transverse pin extends through a selected hole in the beam and is captured in a transverse slot cut in the first body and secured by the first body end plate to create an initial distance between the depending jaws, and wherein a bolt with a head located outside the second body end plate has a threaded portion that extends longitudinally though the interior bore in the second body and through the beam longitudinal bore in threaded connection with the nut so that rotating the head of the bolt further adjusts the distance between the depending jaws.

9. The system of claim 8 wherein the exterior end plates cooperate with the respective bodies for attachment of the depending jaws.

10. The system of claim 8 wherein the beam has a rectangular outer cross section having a major dimension and a minor dimension, and the nut has a square exterior of equal size to the minor dimension of the beam cross section.

11. The system of claim 8 also having a locking cover over the head of the bolt with the cover having a locked state and an unlocked state, and when in the locked state, the head of the bolt cannot be accessed.

12. The system of claim 8 wherein the extrusions have T-shaped slots in the upper surfaces.

13. The system of claim 8 wherein the jaws are attached to their respective bodies and exterior end plates by threaded fasteners extending through the respective exterior end plates.

\* \* \* \* \*